Figure 4:
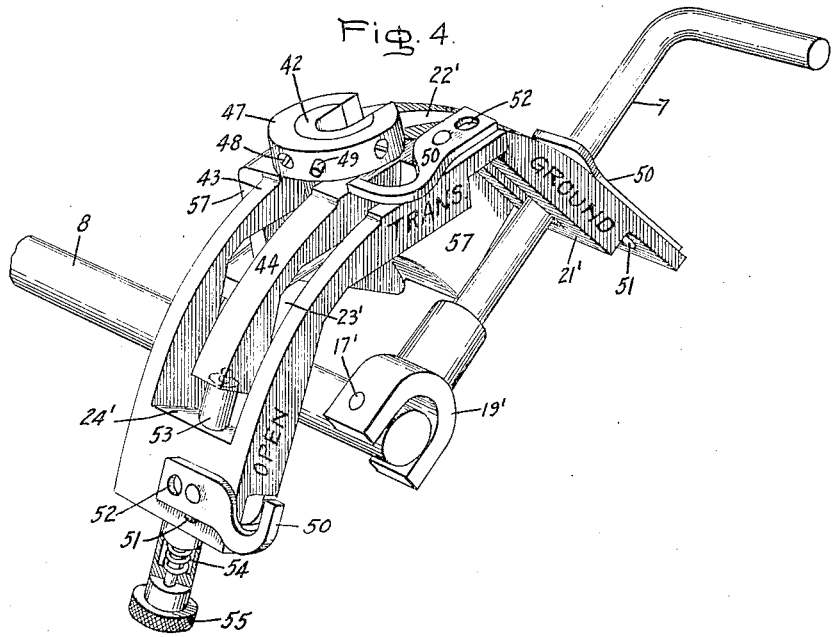

July 27, 1943.  W. W. EDSON  2,325,382
OPERATING MECHANISM FOR ELECTRIC SWITCHES
Filed Jan. 30, 1942  2 Sheets—Sheet 1
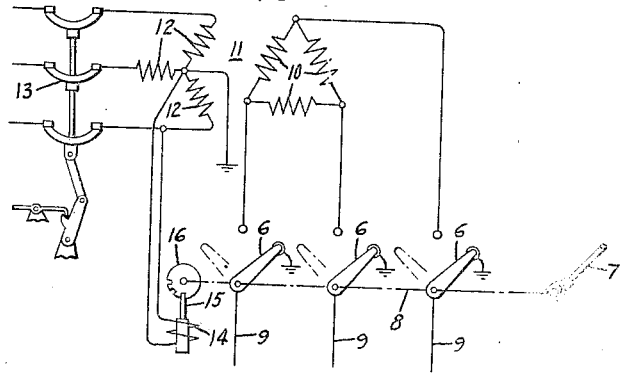
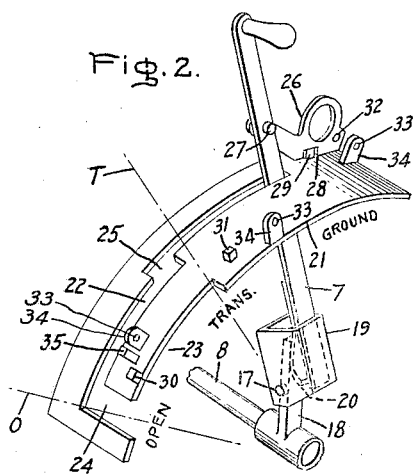
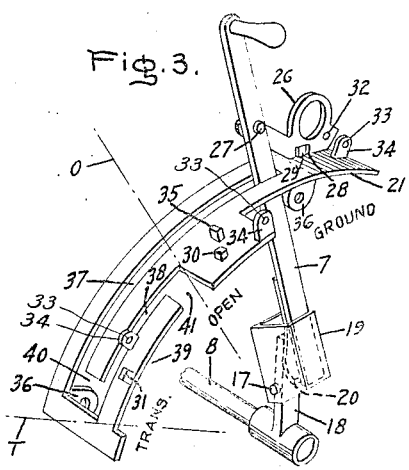
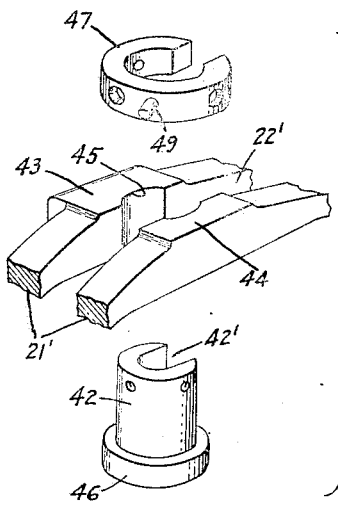
Inventor:
William W. Edson,
by Harry E. Dunham
His Attorney.

July 27, 1943.  W. W. EDSON  2,325,382

OPERATING MECHANISM FOR ELECTRIC SWITCHES

Filed Jan. 30, 1942  2 Sheets-Sheet 2

Inventor:
William W. Edson,
by Harry E. Dunham
His Attorney.

Patented July 27, 1943

2,325,382

UNITED STATES PATENT OFFICE 2,325,382

OPERATING MECHANISM FOR ELECTRIC SWITCHES

William W. Edson, Auburndale, Mass., assignor to General Electric Company, a corporation of New York Application January 30, 1942, Serial No. 428,881

12 Claims. (Cl. 200—50)

My invention relates to improvements in operating mechanisms for electric switches and more particularly disconnecting switches which have a plurality of circuit controlling positions but which are not intended to interrupt currents of load magnitude.

In the operation of so-called low voltage network distribution systems, it is desirable to be able to isolate from the system certain apparatus, such as the network protector, for purposes of inspection, maintenance, repair and replacement. For such isolation, there has been provided on the high voltage feeder side of the transformer a three-position disconnecting switch in the feeder itself whereby the feeder can be connected to or disconnected from the high voltage windings of the network transformer or connected directly to ground. Since for reasons of economy these switches are not designed to interrupt currents of load magnitude and frequently, not even transformer magnetizing currents, they must not be operated while the transformer is energized. In other words, these disconnecting switches should not be operated while the network protector is closed or while the circuit breaker at the supply end of the high voltage feeder is closed, or while both the network protector and the feeder circuit breaker are closed. For this purpose, it is customary to provide the disconnecting switch with an electric interlock which is intended to lock the switch in whatever circuit controlling position it may be at the time the transformer is energized and to maintain the switch in such position as long as the transformer continues to be energized. But upon deenergization of the transformer in consequence of the opening of the feeder circuit breaker at the station and the network protector where the disconnecting switch is usually located, the locking action is temporarily discontinued so that the disconnecting switch may be operated to disconnect, ground or reconnect the high voltage feeder. There is, however, always the possibility that the transformer may be re-energized during the operation of the disconnecting switch because, for example, someone at the remote end of the feeder may close the feeder circuit breaker, and even the network protector may be closed by the usual relaying action if the person responsible has failed to take the necessary precautions. The operation of the disconnecting switch is therefore subject to both personnel and equipment hazards.

In order to avoid these hazards, it is common practice to arrange the disconnecting switch so that in going from the open or disconnected position to the ground position or vice versa, it is necessary to pass through the "on" or transformer connected position. This is done with the idea that, if the transformer becomes energized after leaving either the open position or the ground position, the switch will be locked when it reaches the transformer position, and no harm should result. However, the switch locking arrangement, usually electromagnetic, requires a finite time to function. Accordingly, in order to prevent the person operating the switch from going through the open position or from the open position through the transformer position to the ground position or vice versa too fast for the locking mechanism to function, there is provided some impediment to the movement of the switch in the open position and, also, while passing through the transformer position from either the open position or the ground position. These impediments require such thought and action on the part of the operator as to insure enough time for the normal intended operation of the locking mechanism if the transformer is energized.

One object of my invention is to provide an improved and simple switch operating mechanism whereby in operating the switch, it is necessary to go through the transformer position while going from the open position to the ground position or vice versa, and in so doing or upon going through the open position, the operator is required to perform an operation which does not produce a change in the switch position but does cause enough time delay for the correct functioning of the locking mechanism to prevent hazardous switching. Another object of my invention is to provide an improved switch operating mechanism which can be used as a replacement for operating mechanisms already installed so as to standardize and thereby gain the benefits which accrue from standardization. These and other objects of my invention will appear in more detail hereinafter.

My invention will be better understood from the following description when considered in connection with the accompanying two sheets of drawings, and its scope will be pointed out in the appended claims.

Figure 5:
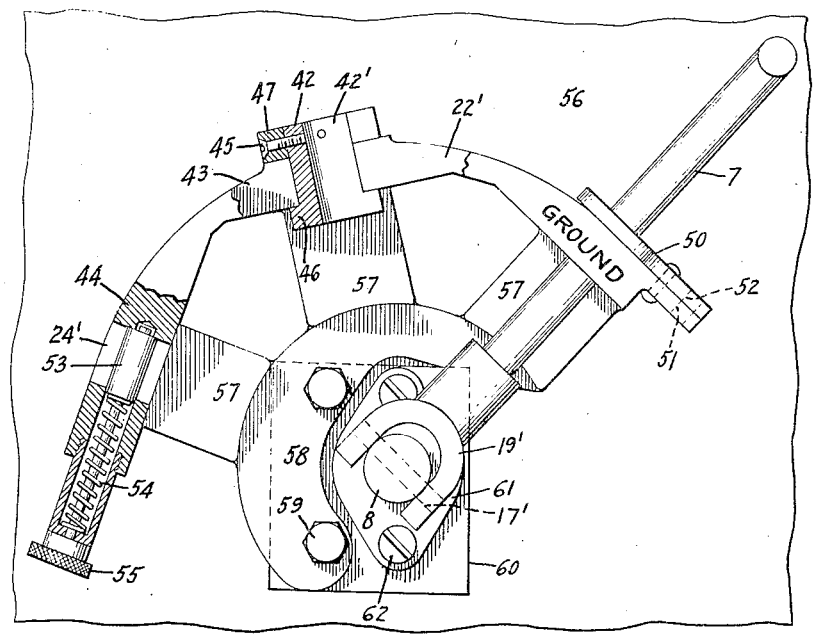

In the accompanying drawings, Fig. 1 diagrammatically illustrates a part of an alternating current network system embodying a switch to which my invention is applicable; Fig. 2 illustrates in perspective an embodiment of my invention arranged for one sequence of switching operations; Fig. 3 illustrates in perspective an embodiment of my invention arranged for a slightly different sequence of switching operations; Fig. 4 illustrates in perspective an embodiment of my invention for the switching sequence illustrated in Fig. 2; Fig. 5 is a front elevation of the embodiment of my invention shown in Fig. 4; and Fig. 6 is an exploded view in perspective of a detail of the embodiment of my invention shown in Fig. 4.

Operating mechanisms embodying my invention are adapted for the operation of disconnecting and grounding switches, examples of which are well known to the art, and one of which is disclosed in United States Letters Patent 1,803,163 dated April 28, 1931. As diagrammatically illustrated in Fig. 1, a three-phase disconnecting and grounding switch has three current conducting arms 6 and an operating crank 7, all of which are mounted on the same shaft, indicated by a dot and dash line 8. The switch arms 6 are connected to the phase conductors 9 of a feeder circuit and in the position shown in full lines, connect these conductors to ground. When the switch arms 6 are vertical, the feeder conductors 9 are connected to the high voltage windings 10 of a transformer 11. As shown, the low voltage windings 12 of this transformer are connected to the network through suitable circuit interrupting means, such as a circuit breaker 13, which forms a part of the so-called network protector. In the extreme left position of the switch arms 6 indicated by the dot and dash lines, the feeder phase conductors 9 are disconnected from the transformer windings 10. The disconnecting and grounding switch schematically illustrated differs from that shown in the above-mentioned patent in that the transformer position is intermediate the open circuit position, represented by the dash and dot lines and the ground position. The switch is also shown as provided with an electromagnetic interlock, such as that illustrated in the above-mentioned patent. This interlock includes an energizing winding 14 which is connected across one of the phase windings 12 of the transformer 11. As shown, the winding 14 is arranged to actuate a locking member 15 to engage any one of three notches in a cooperating locking member 16 which partakes of the movement of the shaft 8 and may be mounted directly thereon. The arrangement is such that as long as the transformer 11 is energized the locking member 15 engages one of the notches in the cooperating member 16 to lock the switch against movement.

Referring now to the embodiment of my invention shown in Fig. 2, a rotatable member such as the shaft 8 has mounted thereon an operating member such as the crank or handle lever 7 whereby the shaft can be turned to a plurality of circuit controlling positions indicated as open, transformer, and ground. In accordance with my invention, the crank 7 is mounted for rotation with the shaft 8 and, also, relatively thereto. Thus, as shown in Fig. 1, the crank 7 is mounted on a pivot pin 17 carried in an extension 18 on the shaft 8. Also, in this specific embodiment of my invention both this extension and the pin 17 are perpendicular to the shaft and to each other. This arrangement provides, in effect, a yoke connection permitting the desired rotative movements of the crank 7. It will be observed that, since the axes of the shaft 8 and the stem of the crank 7 intersect, movement of the crank relatively to the shaft, whenever such movement can occur, is always in the plane determined by these two axes. In order to bias the crank 7 for rotation in a predetermined direction about the pin 17, the lower end of the stem of this crank may have rigidly secured thereto a housing or stirrup portion 19 through opposite sides of which the pin 17 extends. Suitable resilient means, such as a curved leaf spring 20 secured to the crank 7, bears against the shaft extension 18 and tends to turn the crank 7 clockwise about its pivot 17. It will, of course, be apparent to those skilled in the art that the desired rotation of the crank relatively to the shaft and the desired bias action could be obtained by making the crank stem itself a leaf spring member.

Further in accordance with my invention, I provide for the operating member 7 a guiding means so constructed and arranged as to permit the two different rotative movements of the member in a predetermined sequence in order to check the turning of the member in a position corresponding to a predetermined circuit controlling position of the switch. As shown in Fig. 2, this guiding means comprises an arcuate member, such as the curved plate 21 which is preferably concentric with the shaft 8 and provided with a trackway comprising two parallel passages or openings such as slots 22 and 23 or the equivalent through which the crank 7 projects. In Fig. 2, the slot 23 is shown simply as a long notch since the spring 20 exerts no clockwise bias on the crank 7 when it is positioned in the notch 23. The slots 22 and 23 extend in a direction to permit rotation of the crank 7 with the shaft 8. Another slot 24 interconnects the two slots 22 and 23 and extends in a direction to permit the rotation of the crank 7 about its pivot 17. Also, in accordance with my invention, for delaying or checking the movement of the crank 7 in the transformer position as it is being moved from the open position, indicated by the dash-dot line O, to the ground position or vice versa, the slot 22 is provided with a substantially perpendicular offset portion 25 which, like the slot 24, interposes a time action by requiring the operator to change from one direction of rotation of the crank to another in going from one circuit controlling position of the switch to another.

For preventing the rotation of the crank 7 about its own axis while the crank is in predetermined positions and, also, for holding and locking the crank 7 in predetermined positions against rotation with the shaft, I provide releasable means, such as an eye member 26 which is pivotally secured to the crank 7 at 27. As shown, this eye member is provided with a notched portion 28 which is arranged to engage with any one of a plurality of projections 29, 30, and 31, respectively, corresponding to the ground, open, and transformer positions of the switch. In any one of these positions, an opening 32 on the member 26 registers with an opening 33 in one of a plurality of lugs 34 on the plate 21 for the reception of a locking bolt or padlock, not shown. In order to block the movement of the crank 7 in the slot 24, the plate 21 may be provided with a lug 35 which is positioned in the path of movement of the member 26 when the crank 7 is rotated about its own axis while in the slot 24. In any one of the circuit controlling positions of the crank 7, the eye member 26 may be rotated upwardly about its pivot 27 counterclockwise, as shown in the drawings, so as to be clear of the projections 29, 30, 31, and 35.

As shown in Fig. 2, the crank 7 is in the ground position with the locking member 26 in engagement with the projection 29. If it is desired to move the switch to any other circuit controlling position, the locking member 26 must first be released from the projection 29 by rotating it counterclockwise about its pivot 27. The crank 7 may then be turned counterclockwise with the shaft 8. As the crank moves through the slot 22, rotation with the shaft 8 is arrested when the crank comes into the cross slot 25. It is then necessary for the operator of the switch to rotate the crank clockwise about its pivot 17 in order that further counterclockwise movement of the crank in the slot 22 may be effected. During the time required to change the direction of rotation of the crank 7 by reason of the cross slot 25, the magnetic interlock referred to in connection with Fig. 1 is given an opportunity to lock the shaft against further rotation if the transformer is energized when the crank is moved to the transformer circuit closing position. If the transformer is not energized, then further counterclockwise movement of the crank 7 may be made to the open position with the crank still in the slot 22. At this point, further rotation of the crank 7 with the shaft is arrested by the cross slot 24. If now it is desired to go from the open position to the final transformer circuit closing position, indicated by the dash-dot line T, this may be accomplished if the member 26 is moved out of the way of the projection 35 and the crank 7 turned clockwise about its pivot 17 until it is in the notch 23. During this clockwise movement of the crank 7 about its pivot 17, the magnetic lock referred to in connection with Fig. 1 has an opportunity to complete its locking action if the transformer is energized. If the transformer is not energized, then the crank 7 may be rotated clockwise with the shaft 8 to place the switch in the transformer circuit closing position. If it is desired to leave the switch in this position, then the member 26 may be turned clockwise about its pivot to engage the lug 31, and the member 26 may be further locked to the projection 34 to prevent operation of the switch.

In the embodiment of my invention shown in Fig. 3, the sequence of the circuit controlling positions differs from that shown in Fig. 2 in that the open and transformer positions are interchanged. This change of positions requires a different arrangement of the trackway in the plate 21, which is shown with mounting lugs 36 whereby it can be secured to the switch housing or other support, not shown. Because of the angle of the perspective in Fig. 2, these lugs do not show. The trackway in the plate 21 of Fig. 3 comprises three parallel openings, such as slots 37, 38, and 39, or the equivalent, the last of which may be a notch. These slots extend in a direction to permit rotation of the crank 7 with the shaft 8. At the transformer position, the slots 37 and 38 are interconnected by a cross slot 40 which checks the counterclockwise rotation of the crank 7 with the shaft 8 and requires clockwise rotation of the crank 7 about its pivot 17 before the crank can be rotated clockwise with the shaft 8 to the open position of the switch, indicated by the dash-dot line O. This insures enough time delay in the transformer position for the operation of the electromagnetic interlock, not shown. Again, when the crank 7 reaches the open position, its clockwise rotation with the shaft 8 is checked by a cross slot 41 which interconnects the slot 38 and the notch 39. To go to the transformer circuit closing position, it is necessary to rotate the crank 7 clockwise about its pivot 17 into the notch 39. This impediment again gives the electromagnetic lock time to function before the crank 7 can be rotated counterclockwise in the notch 39 with the shaft 8 to the transformer circuit closing position, indicated by the dash-dot line T. As before, the crank 7 may be retained in any of the circuit controlling positions by the eye member 26 and cooperating projections 29, 30, and 31 on the plate 21. Also, the shift between the slot 38 and the notch 39 so as to go from the open position to the transformer position and vice versa may be blocked by the lug 35 in conjunction with the member 26. It will be observed that in this modification of my invention the crank 7 may be moved in the slot 37 from the ground position through the open position of the switch to the transformer circuit closing position without impediment. This is satisfactory because if the transformer is deenergized when the switch leaves the ground position, the fact that it may be energized in the open position or in the transformer circuit closing position is not material because although the usual three-position disconnecting switches are not designed to interrupt load current, they are, in general, capable of closing the circuit for load current. The operation of this embodiment of my invention will be apparent from the foregoing description, particularly when taken in conjunction with the explanation of the operation of the embodiment of my invention shown in Fig. 1.

The embodiment of my invention shown in Fig. 4 is, in general, similar to the arrangement shown in Fig. 2. In Fig. 4, the operating crank 7, again shown in the ground position, is secured to a yoke member 19', which is pivotally secured to the shaft 8 at 17' so that the crank 7 can rotate with the shaft 8 and in the plane determined by the shaft and the crank. In this embodiment of my invention, the guiding means is particularly suited for casting and, as shown, comprises a guiding member 21' which is provided with two parallel openings or passages, such as slots 22' and 23', through which the crank projects. These slots extend in a direction to allow rotation of the crank 7 with the shaft 8.

Because of the change in angularity of the crank 7 relatively to the shaft 8, it is desirable to have the faces of the slots 22' and 23' suitably sloped in order that the crank may have a good full bearing sliding fit in these slots. Thus, if the crank 7 when in the slot 22' is perpendicular to the shaft 8, then the planes of the sides of the slot 22' should also be perpendicular to the shaft. Similarly, the angle between the planes of the sides of the slot 23' and the shaft 8 should correspond to the angle between the shaft and the crank 7 when the crank is in the slot 22'. At the open position, the slots 22' and 23' are interconnected by a cross slot 24' which checks the rotation of the crank 7 with the shaft 8 but permits the rotation of the crank about the pin 17' from either slot to the other.

Instead of offsetting the slot 22' to impede the movement of the crank 7 in going from the ground position through the transformer position to the open position and vice versa, I may provide other suitable checking means. As illustrated, this means is an open sided or slotted member 42 which is rotatably mounted between the ribs 43 and 44 of the guide member 21'. As shown, the member 42 is in the form of a cylindrical bushing which is rotatable in a cylindrical bore 45 in and between the ribs 43 and 44 and is provided with a longitudinal opening 42' large enough to admit the stem of the crank 7. The bushing 42 is retained in position between the ribs 43 and 44 by its flange 46 and a slotted collar 47 which is suitably secured to the bushing 42 as by set screws 48. In order to rotate the bushing 42 in its cylindrical mounting in the guide member 21', there is provided on the collar 47 a suitable projecting member 49.

For retaining the crank 7 in any one of the three circuit controlling positions, there may be provided a plurality of holding members 50, one at each of the circuit controlling positions and each provided with a hook engaging portion for embracing the crank 7. As shown, these holding members 50 are pivotally mounted on the guiding member 21'. This is provided with a plurality of locking openings 51 which register with corresponding openings 52 in the holding members 50 when they are in position to engage the crank 7. These registering openings 51 and 52 may accommodate a suitable locking bolt or padlock, not shown. For blocking the movement of the crank 7 about its pivot pin 17' from the slot 22' to the slot 23' and vice versa, I provide a suitably releasable blocking means which, as shown in Fig. 4, comprises a retractable bolt 53. This is mounted in the guide member 21' and biased to the blocking position, shown, by suitable means, such as a spring 54. The blocking member 53 may be moved to the released position by pulling outwardly on a handle member 55.

For mounting the guiding member on the side of the switch housing 56, it may comprise a plurality of angle extensions 57 which connect to a common supporting part 58. Suitable means, such as bolts 59, serve to fasten the supporting part 58 against a bearing plate 60 on the housing. Since switches of the type for which my operating handle is particularly intended usually operate in an insulating fluid, it is customary to provide suitable fluid retaining means, such as a bushing 61 through which the shaft 8 passes and which is suitably adjustable with respect to the housing 56 as by screws 62.

Assuming the parts positioned as shown in Fig. 4, then the crank 7 may be released by turning the holding member 50 at the ground position out of the holding position shown so that its hook-shaped part is disengaged from the crank 7. The crank 7 may then be rotated in the slot 22' counterclockwise with the shaft 8 into the longitudinal slotted opening 42' of the bushing 42 if the bushing is in the position shown. Otherwise, it must be first turned to this position by means of the actuating projection 49. When the crank 7 moves into the bushing 42, no further counterclockwise rotation with the shaft 8 is possible until the bushing 42 is turned 180°. This is accomplished by pushing or pulling on the operating projection 49. Thus, with the crank 7 in the transformer position, there is interposed a time delay before the crank 7 can be moved to open the transformer circuit. This delayed action, by virtue of the necessity of having to turn the bushing 42 through an angle sufficient to permit the rotation of the counterclockwise movement of the crank 7, is sufficient to give the electromagnetic lock, not shown, time to function if the transformer is energized. If the transformer is not energized, then the counterclockwise movement of the crank 7 with the shaft 8 may be continued to the open position where the shaft motion is arrested when the crank comes to rest at the end of the slot 22'. Before going to the final transformer position where the switch crank is ordinarily left locked, it is necessary to withdraw the blocking member 53 by pulling on the handle 55 and then to rotate the crank 7 clockwise about its pivot 17' until the crank is in the slot 23'. These movements interpose a delay and require such forethought on the part of the operator as to insure operation of the electromagnetic lock if the transformer is energized. The crank 7 may then be rotated clockwise in the slot 23' with the shaft 8 to the transformer position and there retained by moving its hook-engaging member 50 to the holding position and locking it there. The reverse operation of the crank 7 will be obvious from the foregoing, and, of course, it will be necessary to rotate the bushing 42 again in going from the open position to the ground position since there is no through passage in the bushing and its associated collar 47.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In an operating mechanism for an electric switch having a plurality of different circuit controlling positions, a rotatable member, means for turning said rotatable member comprising an operating member mounted on said rotatable member for rotation therewith and, also, relatively thereto, and guiding means for said operating member constructed and arranged to permit only one of the two different rotative movements thereof at a time and both movements in a predetermined sequence whereby to check the turning of said rotatable member in a position corresponding to a predetermined circuit controlling position of the switch.

2. In an operating mechanism for an electric switch having a plurality of different circuit controlling positions, a rotatable member, means for turning said rotatable member comprising an operating member mounted on said rotatable member for rotation therewith and, also, relatively thereto, guiding means for said operating member constructed and arranged to permit the two different rotative movements thereof in a predetermined sequence whereby to check the turning of said rotatable member in a position corresponding to a predetermined circuit controlling position of the switch, and cooperating means on said guiding means and said operating member adapted to be operated to retain the operating member in predetermined positions.

3. In an operating mechanism for an electric switch having a plurality of different circuit controlling positions, a rotatable member, means for turning said rotatable member comprising an operating member mounted on said rotatable member for rotation therewith and, also, relatively thereto, guiding means for said operating member constructed and arranged to permit the two different rotative movements thereof in a predetermined sequence whereby to check the turning of said rotatable member in a position corresponding to a predetermined circuit controlling position of the switch, and releasable means on said guiding means for preventing in one position of the rotatable member the rotation of the operating member about its own axis.

4. In an operating mechanism for an electric switch having a plurality of different circuit controlling positions, a shaft, means for turning said shaft comprising a crank mounted on said shaft for rotation with the shaft and relatively thereto, and a guide plate having a plurality of openings in which said crank is movably positioned, at least two of said openings being substantially parallel and extending in a direction to permit rotation of said crank only with the shaft and another of said openings interconnecting said two openings and extending in a direction to permit rotation of said crank relatively to the shaft.

5. In an operating mechanism for an electric switch having a plurality of different circuit controlling positions, a shaft, means for turning said shaft comprising a crank pivotally mounted on said shaft for rotation with the shaft and about an axis substantially perpendicular to the axis of rotation of the shaft, a guide plate having a plurality of openings in which said crank is movably positioned, at least two of said openings being substantially parallel and extending in a direction to permit rotation of said crank only with the shaft and another of said openings interconnecting said two openings and extending in a direction to permit rotation of said crank only about its own axis, and releasable means on said guide plate for preventing rotation of the crank about its own axis while the crank is in the interconnecting opening.

6. In an operating mechanism for an electric switch having a plurality of different circuit controlling positions, a rotatable member, means for turning said rotatable member comprising an operating member mounted on said rotatable member for rotation therewith and, also, relatively thereto, and means for guiding the rotation of said operating member with said rotatable member from a first circuit controlling position to a second circuit controlling position and thence through said first circuit controlling position to a third circuit controlling position and vice versa including means requiring the rotation of said operating member relatively to said rotatable member while going through said second circuit controlling position in either direction, and means for impeding the movement of the operating member at the first circuit controlling position while going from the second circuit controlling position to the third circuit controlling position and vice versa.

7. In an operating mechanism for an electric switch having a plurality of different circuit controlling positions, a shaft, means for turning said shaft comprising a crank pivotally mounted on said shaft for rotation with the shaft and about an axis substantially perpendicular to the axis of rotation of the shaft, and means for guiding the rotation of said crank with the shaft in one direction from a first circuit controlling position to a second circuit controlling position and in the reverse direction from said second circuit controlling position through said first circuit controlling position to a third circuit controlling position and vice versa including means requiring rotation of the crank about its own pivotal axis before changing the direction of rotation of the shaft in the second circuit controlling position, and means for impeding the movement of the crank at the first circuit controlling position while going from the second circuit controlling position to the third circuit controlling position and vice versa.

8. In an opening mechanism for an electric switch having a plurality of different circuit controlling positions, a shaft, means for turning said shaft comprising a crank pivotally mounted on said shaft for rotation with the shaft and about an axis substantially perpendicular to the axis of rotation of the shaft, and means for guiding the rotation of said crank with the shaft in one direction from a first circuit controlling position to a second circuit controlling position and in the reverse direction from said second circuit controlling position to said first circuit controlling position and thence in said reverse direction to a third circuit controlling position and vice versa including means requiring rotation of the crank about its own pivotal axis before each change in the direction of rotation of the shaft and in going from the first position through the second position to the first position and from the second position through the first position to the third position and vice versa.

9. In an operating mechanism for an electric switch having a plurality of different circuit controlling positions, a shaft, means for turning said shaft comprising a crank pivotally mounted on said shaft for rotation with the shaft and about an axis substantially perpendicular to the axis of rotation of the shaft, and means for guiding the rotation of said crank with the shaft in one direction from a first circuit controlling position to a second circuit controlling position and in the reverse direction from said second circuit controlling position to said first circuit controlling position and thence in said reverse direction to a third circuit controlling position and vice versa including means requiring rotation of the crank about its own pivotal axis before changing the direction of rotation of the shaft in the second circuit controlling position, and means for impeding the movement of the crank at the first circuit controlling position while going from the second circuit controlling position to the third circuit controlling position and vice versa.

10. In an operating mechanism for an electric switch having a plurality of circuit controlling positions, a rotatable member, an operating member joined to said rotatable member and movable therewith and relatively thereto in a plane determined by the axes of said rotatable and operating members, and guiding means for said operating member requiring movement thereof only in such plane in a predetermined circuit controlling position of said switch whenever the switch is actuated through such predetermined circuit controlling position.

11. In an operating mechanism for an electric switch having a plurality of circuit controlling positions, a rotatable member, an operating member arranged for rotation with and relatively to said rotatable member, and guiding means for said operating member constructed and arranged to permit rotation only of the operating member in a predetermined circuit controlling position of said switch whenever the switch is actuated through such predetermined circuit controlling position.

12. In an operating mechanism for an electric switch having a plurality of different circuit controlling positions, a shaft, means for turning said shaft comprising a crank pivotally mounted on said shaft for rotation with the shaft and relatively thereto, and means for guiding the rotation of said crank with the shaft in one direction from a first circuit controlling position to a second circuit controlling position and in the reverse direction from said second circuit controlling position to said first circuit controlling position and thence in said one direction to a third circuit controlling position and vice versa including means requiring rotation of the crank about its own pivotal axis in going from the first position to the second position and through the second position prior to rotation of the shaft in said reverse direction through the first position to the third position and vice versa.

WILLIAM W. EDSON.